United States Patent
Xu et al.

(10) Patent No.: US 9,153,229 B2
(45) Date of Patent: Oct. 6, 2015

(54) METHODS AND SYSTEMS FOR ADAPTING GRAMMARS IN HYBRID SPEECH RECOGNITION ENGINES FOR ENHANCING LOCAL SR PERFORMANCE

(71) Applicant: Robert Bosch GmbH, Stuttgart (DE)

(72) Inventors: Kui Xu, Palo Alto, CA (US); Fuliang Weng, Mountain View, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 13/683,312

(22) Filed: Nov. 21, 2012

(65) Prior Publication Data

US 2013/0132086 A1    May 23, 2013

Related U.S. Application Data

(60) Provisional application No. 61/562,412, filed on Nov. 21, 2011.

(51) Int. Cl.
| | | |
|---|---|---|
| *G10L 15/00* | (2013.01) | |
| *G10L 15/01* | (2013.01) | |
| *G10L 15/065* | (2013.01) | |
| *G10L 15/30* | (2013.01) | |

(52) U.S. Cl.
CPC ............. *G10L 15/01* (2013.01); *G10L 15/005* (2013.01); *G10L 15/065* (2013.01); *G10L 15/30* (2013.01)

(58) Field of Classification Search
CPC ........ G10L 15/32; G10L 15/30; G04G 21/06; G06F 17/30719
USPC ............ 704/257, 9, 277, 275, 270, 255, 251, 704/246, 240, 236, 235, 231; 379/88.01
See application file for complete search history.

(56) References Cited

U.S. PATENT DOCUMENTS

| 4,984,274 | A * | 1/1991 | Yahagi et al. ................. 704/251 |
| 5,638,425 | A * | 6/1997 | Meador et al. ............. 379/88.01 |
| 5,754,978 | A * | 5/1998 | Perez-Mendez et al. ..... 704/255 |
| 6,324,513 | B1 * | 11/2001 | Nagai et al. .................... 704/275 |
| 7,774,202 | B2 * | 8/2010 | Spengler et al. ............. 704/236 |
| 8,140,337 | B2 * | 3/2012 | Nakazawa et al. ............ 704/257 |

(Continued)

OTHER PUBLICATIONS

Zheng-Hua Tan et al; "Speech Recognition on Mobile Devices;" Mobile Multimedia Processing, Springer Berlin Heidelberg, Berlin, Heidelberg, Mar. 25, 2010, pp. 221-237; XP019139924, ISBN: 978-3-642-12348-1.

*Primary Examiner* — Michael Colucci
(74) *Attorney, Agent, or Firm* — Maginot Moore & Beck LLP

(57) ABSTRACT

A speech recognition method includes providing a processor communicatively coupled to each of a local speech recognition engine and a server-based speech recognition engine. A first speech input is inputted into the server-based speech recognition engine. A first recognition result from the server-based speech recognition engine is received at the processor. The first recognition result is based on the first speech input. The first recognition result is stored in a memory device in association with the first speech input. A second speech input is inputted into the local speech recognition engine. The first recognition result is retrieved from the memory device. A second recognition result is produced by the local speech recognition engine. The second recognition result is based on the second speech input and is dependent upon the retrieved first recognition result.

16 Claims, 4 Drawing Sheets

(56) References Cited

U.S. PATENT DOCUMENTS

| | | | |
|---|---|---|---|
| 8,326,631 B1* | 12/2012 | Watson | 704/270 |
| 8,380,502 B1* | 2/2013 | Franz et al. | 704/236 |
| 8,843,376 B2* | 9/2014 | Cross, Jr. | 704/275 |
| 2002/0138274 A1 | 9/2002 | Sharma et al. | |
| 2003/0125945 A1* | 7/2003 | Doyle | 704/246 |
| 2004/0002994 A1* | 1/2004 | Brill et al. | 707/104.1 |
| 2005/0080632 A1* | 4/2005 | Endo et al. | 704/277 |
| 2005/0137866 A1 | 6/2005 | Dow et al. | |
| 2007/0055514 A1* | 3/2007 | Beattie et al. | 704/235 |
| 2007/0136058 A1* | 6/2007 | Jeong et al. | 704/240 |
| 2009/0259466 A1* | 10/2009 | Stubley et al. | 704/240 |
| 2010/0082343 A1* | 4/2010 | Levit et al. | 704/257 |
| 2010/0106497 A1* | 4/2010 | Phillips | 704/231 |
| 2010/0286979 A1* | 11/2010 | Zangvil et al. | 704/9 |
| 2011/0125496 A1* | 5/2011 | Asakawa et al. | 704/231 |

* cited by examiner

METHODS AND SYSTEMS FOR ADAPTING GRAMMARS IN HYBRID SPEECH RECOGNITION ENGINES FOR ENHANCING LOCAL SR PERFORMANCE

CROSS REFERENCES TO RELATED APPLICATIONS/INCORPORATION BY REFERENCE

This application claims priority to U.S. Provisional Patent Application No. 61/562,412 filed on Nov. 21, 2011, entitled "METHODS AND SYSTEMS FOR ADAPTING GRAMMARS IN HYBRID SPEECH RECOGNITION ENGINES FOR ENHANCING LOCAL SR PERFORMANCE". The complete subject matter of this patent application is hereby incorporated herein by reference, in its entirety.

BACKGROUND OF THE INVENTION

1. Field of the Invention

The disclosure relates to speech recognition (SR) and, more particularly, relates to speech recognition using server-based speech systems.

2. Description of the Related Art

Today, speech recognition is available not only on local machines, such as laptops, tablet computers and embedded systems, but also over servers that are connected via the Internet or cell phones. While the local speech engines can guarantee the availability of the functionality, their performance is typically inferior to that of the server-based speech systems in certain domains and their improvements and upgrades are less frequent than those of the server-based systems. On the other hand, the server-based speech systems are not always available when they are needed due to lack of connectivity, especially in remote areas.

SUMMARY OF THE INVENTION

This disclosure provides an adaptation framework that leverages the power from the server-based speech recognition systems and adapts the local speech recognition systems for better performance over the time.

In one embodiment, the disclosure comprises a speech recognition method includes providing a processor communicatively coupled to each of a local speech recognition engine and a server-based speech recognition engine. A first speech input is inputted into the server-based speech recognition engine. A first recognition result from the server-based speech recognition engine is received at the processor. The first recognition result is based on the first speech input. The first recognition result is stored in a memory device in association with the first speech input. A second speech input is inputted into the local speech recognition engine. The first recognition result is retrieved from the memory device. A second recognition result is produced by the local speech recognition engine. The second recognition result is based on the second speech input and is dependent upon the retrieved first recognition result.

In another embodiment, the disclosure comprises a speech recognition arrangement including a local speech recognition engine, a server including a server-based speech recognition engine, a user interface having a microphone, a processor communicatively coupled to each of the local speech recognition engine, the server-based speech recognition engine, and the user interface. The user interface captures a first speech input by use of the microphone and transmits the first speech input to the processor. The processor inputs the first speech input into the server-based speech recognition engine. The server-based speech recognition engine outputs a first recognition result based on the first speech input. A memory device stores the first recognition result in a memory device in association with the first speech input. The local speech recognition engine receives a second speech input and produces a second recognition result based on the second speech input and dependent upon the first recognition result.

In yet another embodiment, the disclosure comprises a speech recognition method including using a microphone to capture a plurality of first speech inputs. The first speech inputs are inputted into a server-based speech recognition engine. First recognition results are received from the server-based speech recognition engine. The first recognition results are based on the first speech inputs. A plurality of confidence scores are received from the server-based speech recognition engine. Each of the confidence scores is indicative of a degree of confidence of the server-based speech recognition engine in a correctness of a respective said first recognition result. The first recognition results are presented to a user. A plurality of confirmations are received from the user. Each of the confirmations is indicative of whether a respective one of the first recognition results is correct. The first recognition results are stored in a memory device. Each of the first recognition results is stored in association with a respective one of the first speech inputs. The storing is dependent upon both the confidence scores and the confirmations from the user. A number of times that both the confidence score exceeds a threshold level and the user confirms the correctness of the first recognition result is counted. A second speech input is inputted into the local speech recognition engine. At least one of the first recognition results is retrieved from the memory device. A second recognition result is produced by the local speech recognition engine. The second recognition result is based on the second speech input and is dependent upon the retrieved at least one first recognition result only if the number of times that both the confidence score exceeds the threshold level and the user has confirmed the correctness of the first recognition result is greater than a predetermined number.

BRIEF DESCRIPTION OF THE DRAWINGS

The above-mentioned and other features and advantages of the disclosure will become more apparent to one with skill in the art upon examination of the following figures and detailed description. The components in the figures are not necessarily to scale, emphasis instead being placed upon illustrating the principles of the invention. Moreover, in the figures, like reference numerals designate corresponding parts throughout the different views.

DESCRIPTION OF THE PRESENT INVENTION

Figure 1:
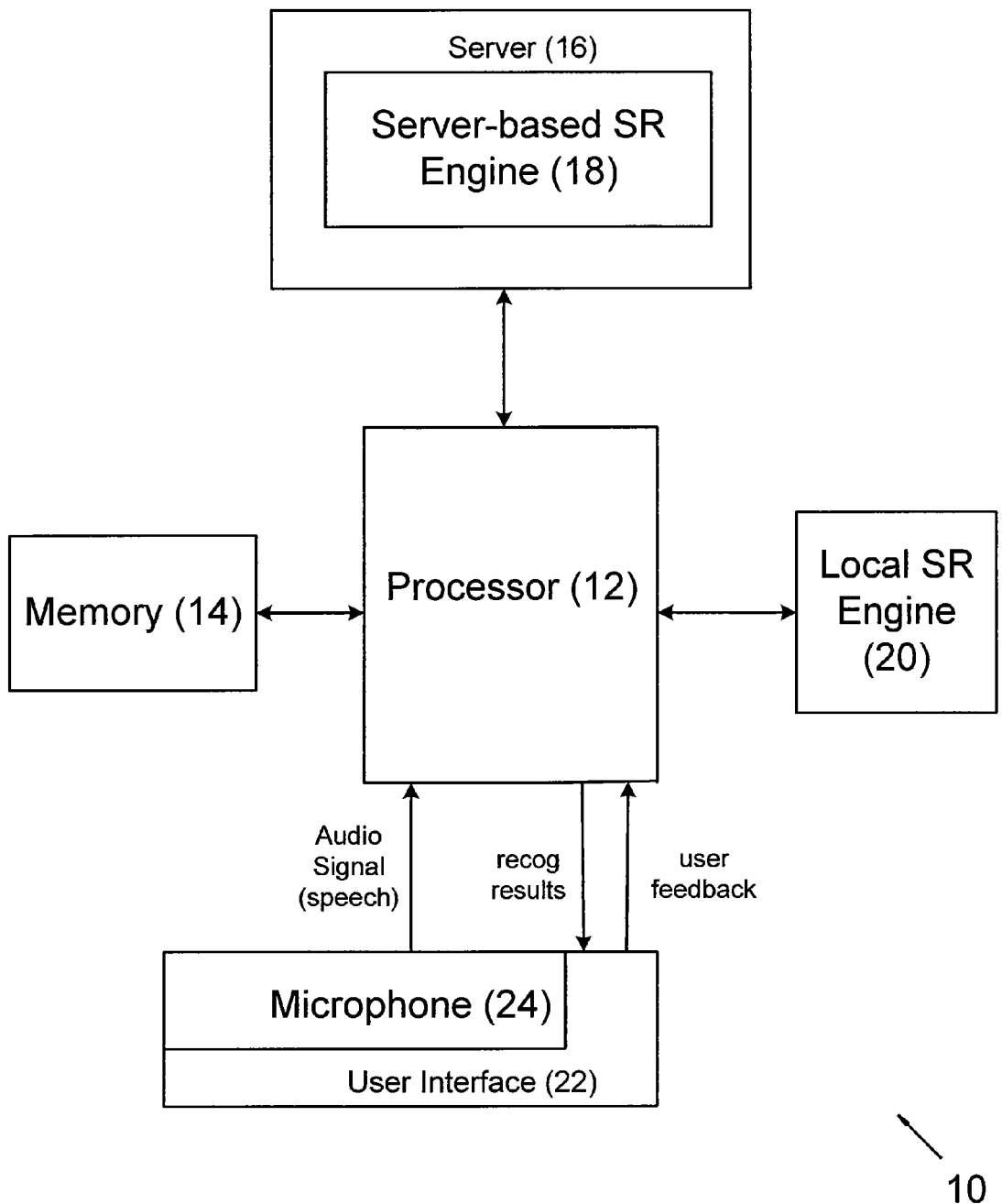
FIG. 1 is a block diagram of one embodiment of a speech recognition arrangement of the present disclosure.

Referring now to the drawings, and particularly to FIG. 1, there is illustrated one embodiment of a speech recognition arrangement 10 of the present disclosure including a central processor 12 (e.g., a microprocessor) in bi-directional communication with each of a memory device 14, a server 16 having a server-based speech recognition engine 18, a local speech recognition engine 20 and a user interface 22. User interface 22 includes a microphone 24 for capturing audible spoken utterances by a user, translating the utterances into an electrical audio signal 26, and transmitting signal 26 to processor 12.

Figure 2:
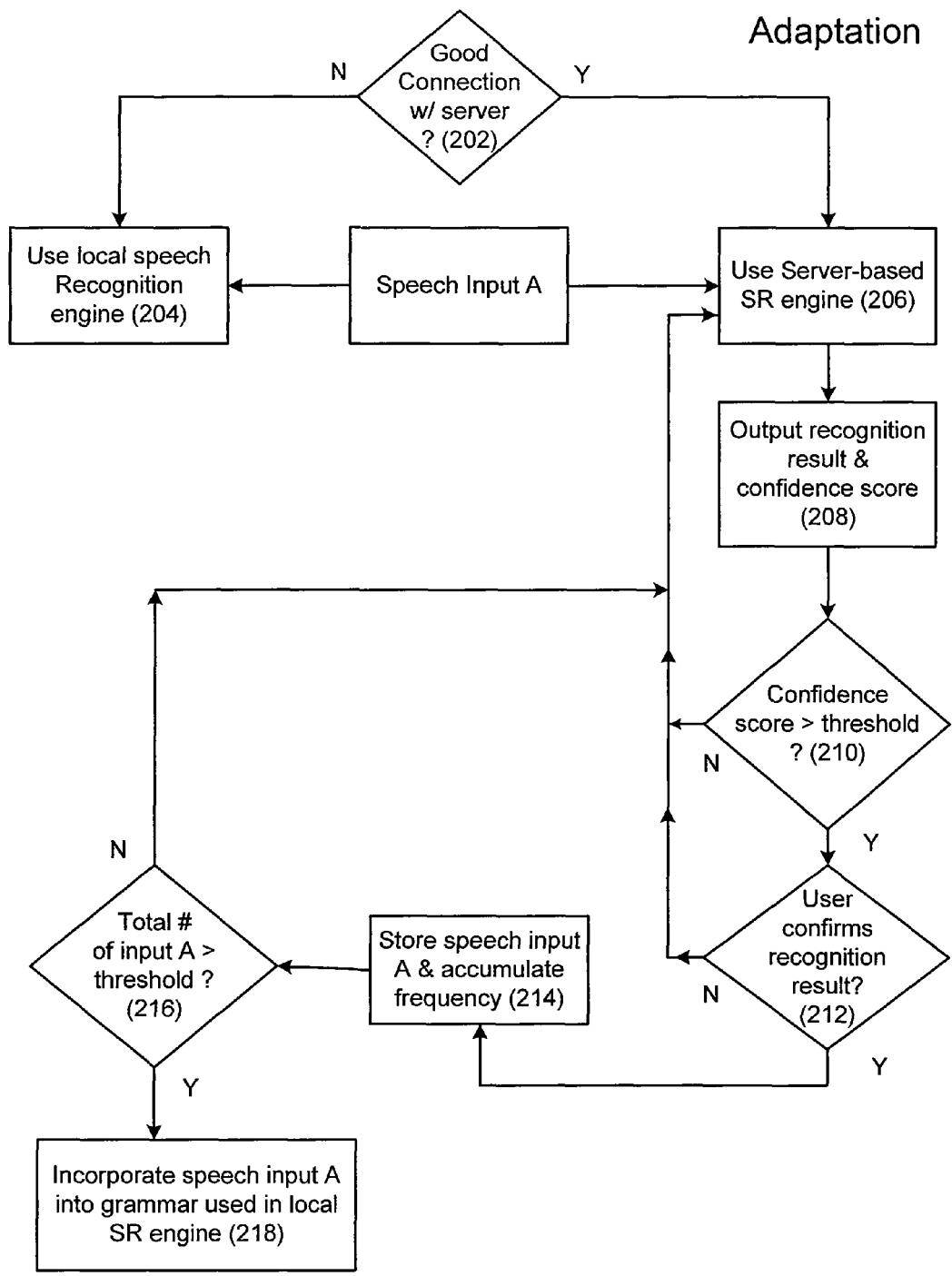
FIG. 2 is a flow chart of one embodiment of an adaptation phase of a speech recognition method of the present disclosure.

Arrangement 10 includes an adaptation framework which may include at least local speech recognition engine 20 and server-based engine 18. When there is a good connection between processor 12 and server 16, the server-based speech recognition engine 18 is used to recognize and/or interpret a given speech input A carried by audio signal 26. As shown in FIG. 2, which is a flow chart of one embodiment of an adaptation phase of a speech recognition method 200 of the present invention, it is decided in step 202 whether there is a good connection between processor 12 and server-based engine 18. For example, processor 12 may send a ping or communication initiation signal to server 16. If server 16 responds with an acknowledgement signal that is received by processor 12, then it may be determined that there is a good connection with server 16.

If it is determined in step 202 that there is not a good connection with server 16, then local speech recognition engine 20 is used to recognize speech input A (step 204). On the other hand, if it is determined in step 202 that there is a good connection with server 16, then server-based speech recognition engine 18 is used to recognize speech input A (step 206).

If server-based speech recognition engine 18 is used to recognize speech input A (step 206), then in step 208 server-based speech recognition engine 18 outputs a recognition result and a confidence score, which may be the degree of confidence, expressed in terms of percentage, that the recognition result is correct.

In step 210, it is determined whether the confidence score exceeds a threshold level, e.g., 90% chance that the recognition result is correct. If not, then operation returns to step 206 and a next speech input A is recognized by server-based speech recognition engine 18. However, if the confidence score does exceeds a threshold level, then operation continues to step 212 where the recognition result is presented to the user and he is given the opportunity to provide feedback by confirming the correctness of the recognition result. For example, the recognition result may be displayed on a display screen of user interface 22, or the recognition result may be audibly spoken to the user with a synthesized voice on an audio speaker of user interface 22. The user may confirm the correctness of the recognition result (e.g., the recognition matches what the user actually said) by audibly speaking into microphone 24 or by using a pushbutton or keyboard of user interface 22, for example. If the user cannot confirm the correctness of the recognition result, then operation returns to step 206 and a next speech input A is recognized by server-based speech recognition engine 18. However, if the confidence score from the server-based system is high (e.g., greater than a threshold level as determined in step 210) and the user gives a confirmed follow up response in step 212, then the particular speech input A may be stored and its frequency is accumulated in step 214. For example, a counter may be incremented each time the particular speech input A is stored due to its recognition confidence level being high and the user confirming the correctness of the recognition by server-based speech recognition engine 18.

The adaptation on the local speech engine may kick in when the number of the accumulated sentences reaches a certain threshold. For example, in step 216 it is determined whether the accumulated number of instances of the recognition of input A having a confidence score above a threshold and the user confirming the correctness of the recognition of input A exceeds a threshold number of times. That is, it may be determined in step 216 whether the current value of the aforementioned counter exceeds a threshold value. If not, then operation returns to step 206 and a next speech input A is recognized by server-based speech recognition engine 18. On the other hand, if the counter value does exceed the threshold value in step 216, then operation proceeds to step 218 where speech input A is incorporated into a grammar used in local speech recognition engine 20.

Figure 3:
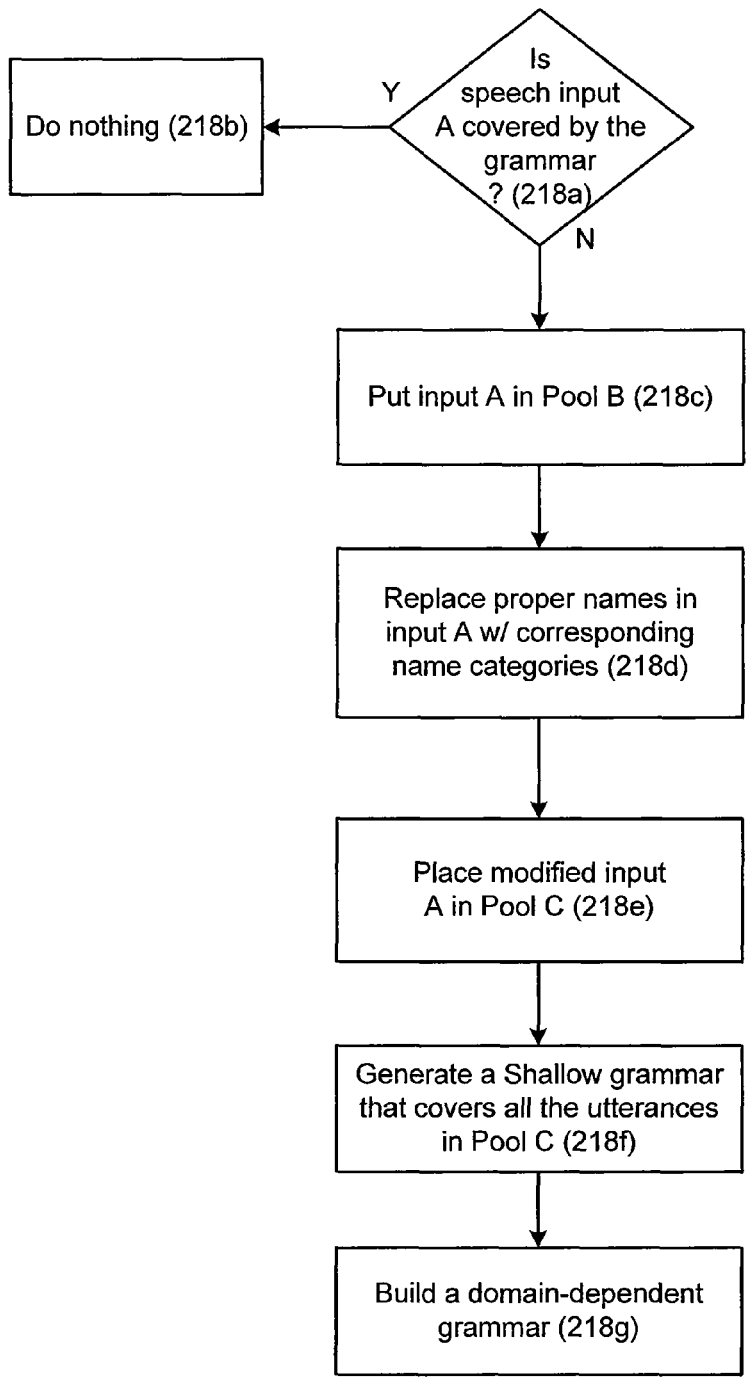
FIG. 3 is a flow chart of one embodiment of the detail of the incorporation step of FIG. 2.

If the local speech engine 20 is a grammar based model, then, as described above, the speech input utterances that have frequencies greater than a given threshold may be incorporated into the grammar used in the local speech engine 20 (step 218). The details of the incorporation may be performed through the steps illustrated in FIG. 3. In a first step 218*a*, processor 12 may check to see whether any of these high frequency utterances are covered by the grammar. That is, it may be determined in step 218*a* whether speech input A is covered by the grammar used in the local speech engine 20. If it is determined in step 218*a* that the utterance associated with speech input A is covered by the grammar and the grammar does not allow any weights on its rule, then nothing is done (step 218*b*). On the other hand, if it is determined in step 218*a* that the utterance associated with speech input A is not covered by the grammar, then the utterance associated with speech input A may be put into a pool B (step 218*c*). In a next step 218*d*, for each utterance in pool B, any proper names may be replaced with their corresponding name categories. For example, if the utterance includes the proper name "John", then "John" may be replaced with "First_Name"; if the utterance includes the proper name "Chicago", then "Chicago" may be replaced with "City_Name"; and if the utterance includes the proper name "Harvard", then "Harvard" may be replaced with "School_Name", etc. The utterances associated with speech input A and thus modified in step 218*d* may be collected to form a pool C (step 218*e*). In a next step 218*f*, a shallow grammar is generated that covers all the utterances in pool C. As used herein, a "shallow grammar" may refer to a grammar that is based on or that incorporates name categories, and that is not based on or that does not incorporate proper names. Shared structures or sequences of symbols in a shallow grammar are merged for an optimized performance. For example, if "I want to hear a folk song" and "I want to hear some music" are in pool C, the shared sub-sequence "I want to hear" from the two utterances is merged in a grammar rule. In a final step 218*g*, when the domain information is available for the collected utterances in pool C, a domain dependent grammar may also be built.

Figure 4:
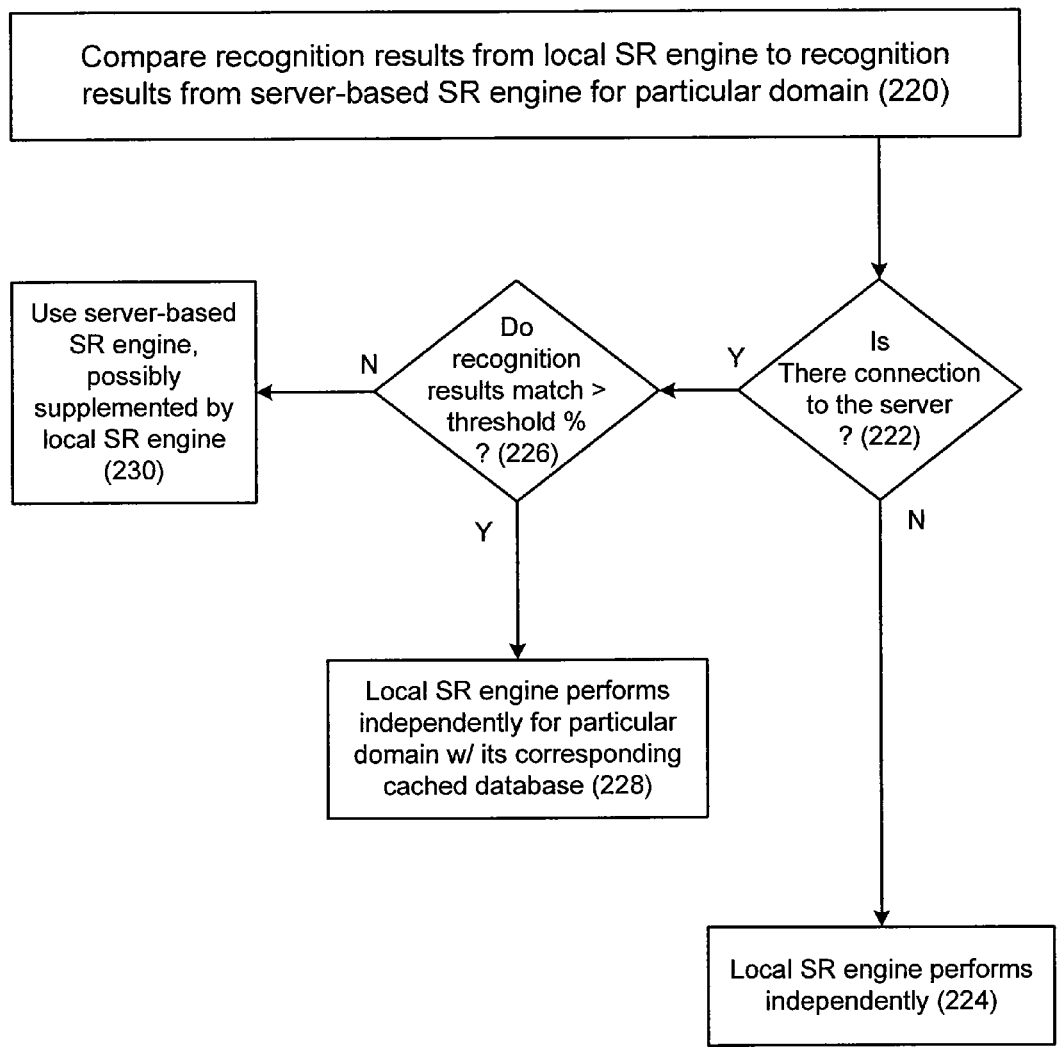
FIG. 4 is a flow chart of one embodiment of a post-adaptation phase of the speech recognition method of FIG. 2.

Illustrated in FIG. 4 is a flow chart of one embodiment of a post-adaptation phase of speech recognition method 200. After the adaptation phase, for a certain period of time, the recognition results from both local recognizer 20 and server-based recognizer 18 may be compared (step 220). In one embodiment, the comparisons are made separately for each particular domain. In the speech recognition context, "domain" may refer to the application that the speech recognition is being applied to, e.g., health care, telephony, etc. Each domain may have its own distinctive terminology and/or grammar, and thus the degree to which the local speech recognition engine results match the server-based speech recognition engine results may depend on the particular domain.

In step 222, it is determined whether there is a good connection between processor 12 and server 16. If there is not a good connection, then local speech recognition engine 20 performs speech recognition separately in step 224.

Next, in step 226, it is determined whether the speech recognition results of local engine 20 match the speech recognition results of server-based engine 18 by more than a threshold degree. If the results from the two engines match beyond a certain percentage, then the local speech engine can perform independently for that particular domain with its corresponding cached database (step 228). That is, in step 228, the local engine may start the recognition with the adapted model or grammar. Thus, the utterances that the user produced and that were recognized by the server can also be recognized by the local speech engine. The user may not perceive any difference in performance between the server-based speech recognition engine and the local speech recognition engine. This may advantageously result in a same user experience when the server-based speech recognition engine is not available. If, however, the recognition results do not match beyond the required threshold level in step 226, then processor 12 may continue to use the server-based speech recognition engine, possibly supplemented by use of the local speech recognition engine (step 230).

The framework described above can be applied to both grammar based language modeling and statistical based language modeling. The disclosure may be used in in-car navigation products, security systems, telemedicine healthcare products, home appliances, electronic devices, and power tools, for example.

It is known with distributed speech recognition (SR) that different SR stages are handled at different computing devices. For example, front-end processing may be done in one computing device, acoustic score computing may be done in another computing device, and search may be done in yet another computing device. In contrast, the disclosure may use multiple speech engines and adapt the local engine based on the collected high quality speech results from the server engine.

Novel features of the disclosure may include using local and server-based SR engines and adapting the local speech engine based on the high quality speech recognition results from the server engine; adaptation of the local speech engine when the local speech engine uses a grammar for recognition; adaptation of the local speech engine when the local speech engine uses a statistical model for recognition; and using the local speech engine with a cached local database for recognition when there is no connection to the server. The local engine may also use a local database for recognition when the server-based speech recognition engine is connected and available. Furthermore, in the opposite direction, the high quality results from the local speech recognizer may also be loaded to the server side to update the models of the server-based speech recognizer.

While this disclosure has been described as having an exemplary design, the present disclosure may be further modified within the spirit and scope of this disclosure. This application is therefore intended to cover any variations, uses, or adaptations of the invention using its general principles.

What is claimed is:

1. A speech recognition method, comprising the steps of:
providing a processor communicatively coupled to each of a local speech recognition engine and a server-based speech recognition engine;
inputting a first speech input into the server-based speech recognition engine;
receiving at the processor a first recognition result from the server-based speech recognition engine, the first recognition result being based on the first speech input;
storing the first recognition result in a memory device, the first recognition result being stored in association with the first speech input;
inputting a second speech input into the local speech recognition engine;
retrieving the first recognition result from the memory device;
producing a second recognition result by the local speech recognition engine, the second recognition result being based on the second speech input and being dependent upon the retrieved first recognition result;
counting a number of times that the user confirms the correctness of the first recognition result, the second recognition result being dependent upon the retrieved first recognition result only if the number of times that the user has confirmed the correctness of the first recognition result is greater than a predetermined number.

2. The method of claim 1, comprising the further step of receiving at the processor a confidence score from the server-based speech recognition engine, the confidence score being indicative of a degree of confidence of the server-based speech recognition engine in a correctness of the first recognition result, the storing step being dependent upon the confidence score.

3. The method of claim 2, comprising the further step of counting a number of times that the confidence score exceeds a threshold level, the second recognition result being dependent upon the retrieved first recognition result only if the number of times that the confidence score exceeds the threshold level is greater than a predetermined number.

4. The method of claim 1, comprising the further step of determining whether there is a connection between the processor and a server hosting the server-based speech recognition engine, the producing step being dependent upon an existence of the connection.

5. The method of claim 1, wherein the producing step includes incorporating the first speech input into a grammar used in the server-based speech recognition engine.

6. The method of claim 5, wherein the grammar is dependent upon a domain of the first speech input.

7. The method of claim 5, wherein the incorporating step includes replacing a proper name in the first speech input with a corresponding name category to thereby create a modified first speech input.

8. The method of claim 5, wherein the incorporating step includes generating a shallow grammar that covers the modified first speech input.

9. The method of claim 1, comprising the further steps of:
comparing the first recognition result from the server-based speech recognition engine to the second recognition result from the local speech recognition engine;
determining whether the first recognition result matches the second recognition result;
inputting a third speech input into the local speech recognition engine; and
refraining from inputting the third speech input into the server-based speech recognition engine only if the first recognition result matches the second recognition result.

10. A speech recognition method, comprising the steps of:
using a microphone to capture a plurality of first speech inputs;
inputting the first speech inputs into a server-based speech recognition engine;
receiving first recognition results from the server-based speech recognition engine, the first recognition results being based on the first speech inputs;

receiving a plurality of confidence scores from the server-based speech recognition engine, each of the confidence scores being indicative of a degree of confidence of the server-based speech recognition engine in a correctness of a respective said first recognition result;

presenting the first recognition results to a user;

receiving a plurality of confirmations from the user, each of the confirmations being indicative of whether a respective one of the first recognition results is correct;

storing the first recognition results in a memory device, each of the first recognition results being stored in association with a respective one of the first speech inputs, the storing being dependent upon both the confidence scores and the confirmations from the user;

counting a number of times that both the confidence score exceeds a threshold level and the user confirms the correctness of the first recognition result;

inputting a second speech input into the local speech recognition engine;

retrieving at least one of the first recognition results from the memory device; and producing a second recognition result by the local speech recognition engine, the second recognition result being:
based on the second speech input; and
dependent upon the retrieved at least one first recognition result only if the number of times that both the confidence score exceeds the threshold level and the user has confirmed the correctness of the first recognition result is greater than a predetermined number.

11. The method of claim 10, comprising the further step of determining whether there is a connection between the processor and a server hosting the server-based speech recognition engine, the local speech recognition engine producing the second recognition result if the connection does not exist, and the server-based speech recognition engine producing the second recognition result if the connection does exist.

12. The method of claim 10, wherein the producing step includes incorporating the first speech input into a grammar used in the server-based speech recognition engine.

13. The method of claim 12, wherein the grammar is dependent upon a domain of the first speech input.

14. The method of claim 12, wherein the incorporating step includes replacing a proper name in the first speech input with a corresponding name category to thereby create a modified first speech input.

15. The method of claim 14, wherein the incorporating step includes generating a shallow grammar that covers the modified first speech input.

16. The method of claim 10, comprising the further steps of:
comparing at least one of the first recognition results from the server-based speech recognition engine to the second recognition result from the local speech recognition engine;
determining whether the at least one first recognition result matches the second recognition result;
inputting a third speech input into the local speech recognition engine; and
refraining from inputting the third speech input into the server-based speech recognition engine only if the at least one first recognition result matches the second recognition result.

* * * * *